United States Patent [19]
Pomo et al.

[11] Patent Number: 5,973,479
[45] Date of Patent: Oct. 26, 1999

[54] DEVICE AND METHOD FOR CHARGING BATTERIES WITH A VARIABLE CURRENT

[75] Inventors: Vittorio Pomo, Turin; Dario Mellina, Strambino, both of Italy

[73] Assignee: Ing. C. Olivetti & C., S.p.A., Italy

[21] Appl. No.: 08/860,229

[22] PCT Filed: Dec. 18, 1995

[86] PCT No.: PCT/IT95/00221

§ 371 Date: Jun. 23, 1997

§ 102(e) Date: Jun. 23, 1997

[87] PCT Pub. No.: WO96/19860

PCT Pub. Date: Jun. 27, 1996

[30] Foreign Application Priority Data

Dec. 22, 1994 [IT] Italy ................................ TO94A1057

[51] Int. Cl.$^6$ ....................................................... H02J 7/00
[52] U.S. Cl. ........................................... 320/150; 324/431
[58] Field of Search ................................... 320/150, 151; 324/431

[56] References Cited

U.S. PATENT DOCUMENTS

| | | | |
|---|---|---|---|
| 4,727,306 | 2/1988 | Misak et al. | 320/150 |
| 5,329,219 | 7/1994 | Garret | 320/150 |
| 5,541,496 | 7/1996 | Simmonds | 320/151 |
| 5,563,494 | 10/1996 | Cuesta et al. | 320/150 |

FOREIGN PATENT DOCUMENTS

| | | |
|---|---|---|
| 0 626 746 | 5/1994 | European Pat. Off. . |
| 32 14745 | 7/1983 | Germany . |
| 41 25825 | 2/1993 | Germany . |
| WO 93/19496 | 9/1993 | WIPO . |

*Primary Examiner*—Peter S. Wong
*Assistant Examiner*—Gregory J. Toatley, Jr.
*Attorney, Agent, or Firm*—Banner & Witcoff, Ltd.

[57] ABSTRACT

A device (10) and method for charging rechargeable type batteries (11) in which the charging current (Ib) supplied the batteries is measured and the temperature variation (ΔTeff) of the batteries is determined over an established interval of time. Furthermore, this variation is compared with a reference value (ΔTref) so that battery charging can be interrupted when the variation equals or exceeds the reference value (ΔTref). The reference value (ΔTref) is defined in relation to the current (Ib) charging the batteries (11) so as to take into account all the possible current values with which the batteries are charged. To advantage, battery charging is interrupted and battery overloading avoided when the charging of the batteries (11) is terminated by a very low charging current. The device (10) and method are particularly suitable for charging the batteries of electronic equipment, such as a personal computer or similar.

10 Claims, 3 Drawing Sheets

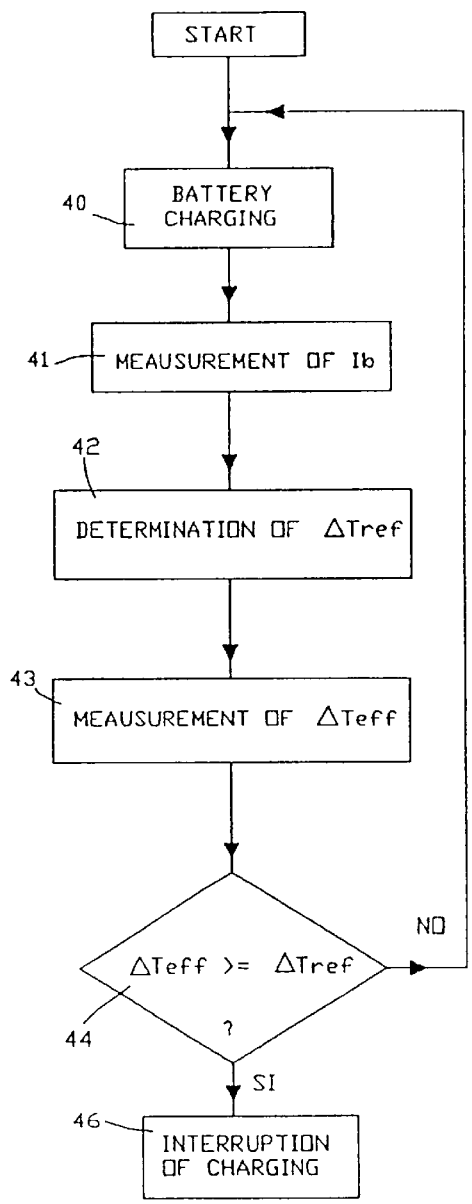
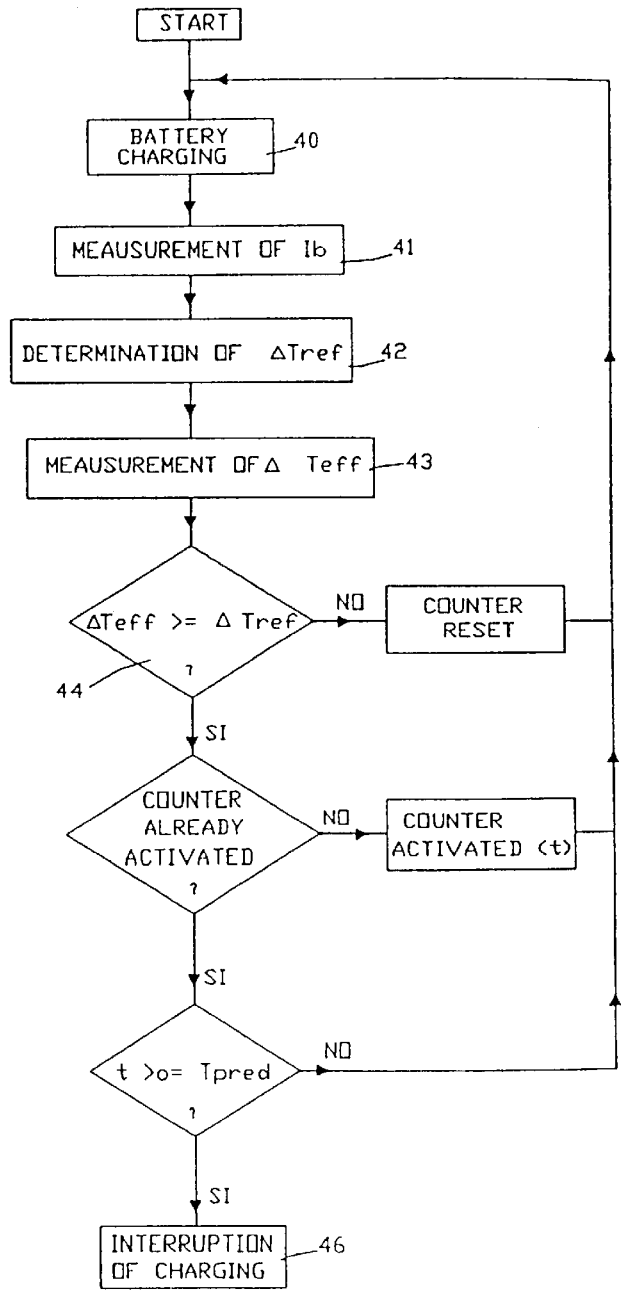
Fig. 2
Fig. 5

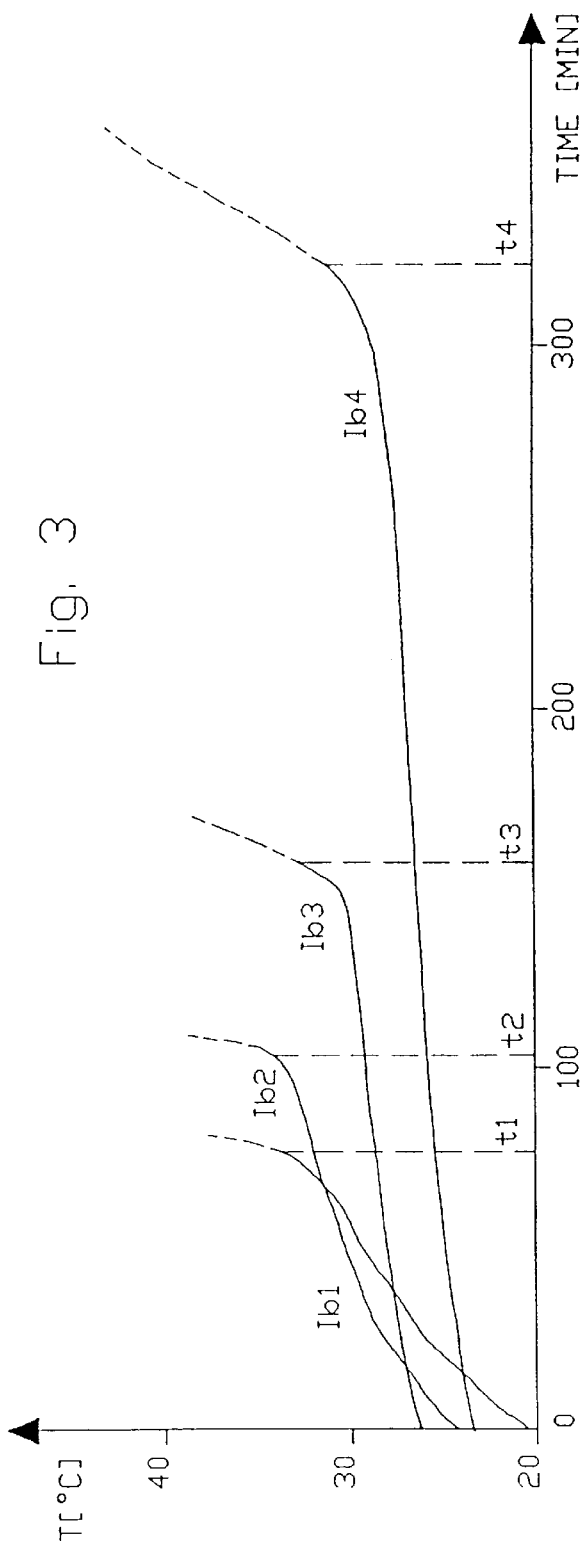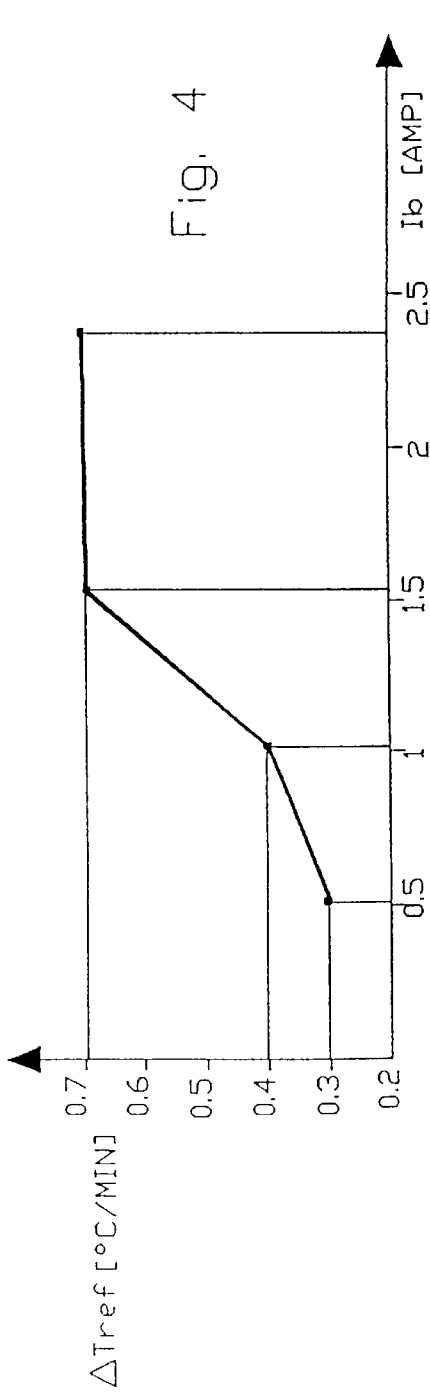

DEVICE AND METHOD FOR CHARGING BATTERIES WITH A VARIABLE CURRENT

FIELD OF THE INVENTION

The present invention relates to a device for charging rechargeable batteries, comprising means for measuring the value of the battery charging current, means for measuring temperature of the battery and determining its variation over an established interval of time, means for comparing the temperature variation value with a reference value and means for interrupting the charge phase when the temperature variation value equals or exceeds the reference value. The present invention also relates to the method of charging the batteries.

BACKGROUND OF THE INVENTION

Today's rechargeable batteries, particularly those used to power portable electronic equipment such as personal computers, have a life-span limited to a few hours so that it is necessary to recharge them often. This is generally done by means of a power supply-transformer connected to the A-C mains.

In order not to damage the batteries and to prolong life-span as much as possible, it is necessary for charging to be performed with the maximum efficiency, without overloading the batteries, i.e. without supplying them a charge greater than the charge they can accept. The charge, or recharge, must therefore be interrupted at the proper time, when the battery is fully charged or at least close to termination of the charge.

It is known from U.S. Pat. No. 5,329,219 a method for establishing when to stop the charging of the battery, wherein the increase in temperature of the battery is detected in a given interval of time, during the recharge process, and this increase is compared with a predetermined reference value. By selecting a sufficiently small interval of time, the temperature increase is considered, with a sufficient degree of approximation, equivalent to the rate of change of temperature with respect to time.

When the temperature increase in the given interval of time, i.e. the rate of change of temperature, exceeds the reference value, it is considered that the battery has reached, or is close to, its maximum allowable charge level and as a result the current supplied to the battery is switched to a lower current, known as trickle current.

It is also known to any person skilled in the art a method for interrupting wholly the supply of current to the battery, at the exceeding of the reference value.

However, these methods of establishing if the battery has reached its maximum permissible charge level are effective and dependable only when the charging current supplied to the battery by the power supply is substantially constant and sufficiently high, as the reference value is set for a given charging current only.

In practice however, it often happens that the charging current supplied to the battery is lower than the set value and, in an extreme situation, is of a value close to zero. This may happen, for example, when the battery is being charged and the electronic equipment using it, a portable personal computer for example, is in operation at the same time. This is due to the fact that the electronic equipment, to power its operating circuits, normally absorbs a large amount of the current supplied by the power supply which is also powering the battery. As the current supplied by the power supply remains substantially constant in time and is not normally susceptible to increases, the current available is obviously shared, with consequent reduction and variability of the current powering the battery.

With less current reaching the battery, temperature of the latter rises more slowly so that its rate of change in time also remains at low levels, which could be practically negligible and, in any case, permanently under the reference value or threshold, if this value were chosen in relation to a high charging current, and it would therefore be difficult to detect when the battery is charged. As a result, the battery would continue to be charged beyond its capacity and could possibly, in an extreme case, explode.

SUMMARY OF THE INVENTION

The technical problem that the present invention proposes to resolve is that of providing a device that optimizes battery charging even in the event of the latter charging being made at low current, and of achieving this purpose simply and inexpensively.

This technical problem is resolved by the battery charger device according to this invention, which is characterized by the fact that the reference value for temperature variation is defined in relation to the value of the current that is actually charging the battery.

The device for charging a battery in accordance with this invention has the advantage of requiring that only one temperature sensor be integral with the battery pack.

BRIEF DESCRIPTION OF THE DRAWINGS

This and other characteristics of the present invention will become clear in the following description of a preferred embodiment, provided by way of example only and by no means exhaustive, with the aid of the accompanying drawings, in which:

FIG. 2 is a block diagram of the different stages of the method according to the present invention;

FIG. 3 represents the timing diagrams illustrating some temperature trends of a battery charged with the device of FIG. 1;

FIG. 4 represents a diagram illustrating the relationship between the charging current and the rate of change of temperature of a battery charged with the device of FIG. 1; and FIG. 5 represents a functional block diagram of one variant of the method illustrated in FIG. 2.

DETAILED DESCRIPTION OF A PREFERRED EMBODIMENT

Figure 1:
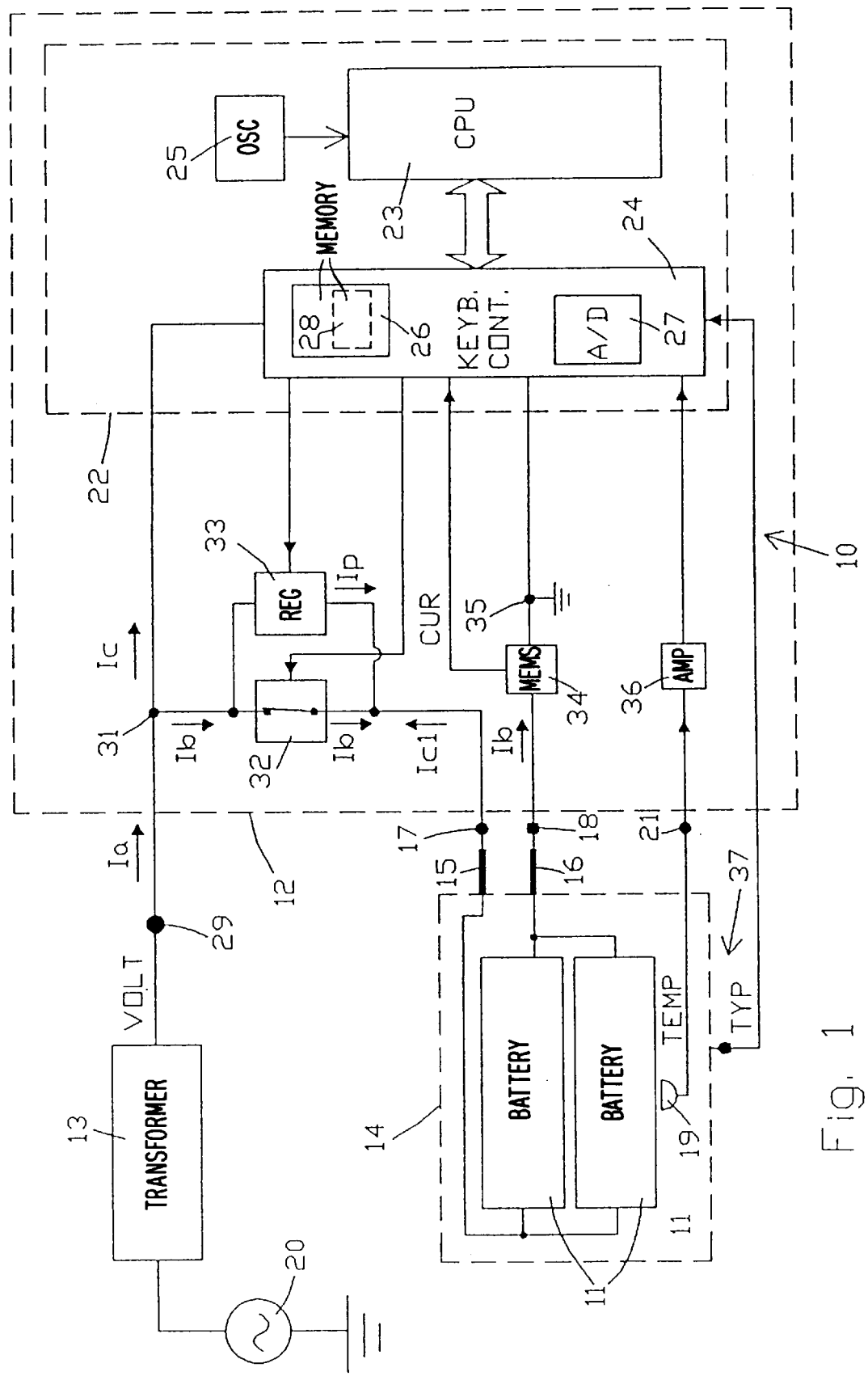
FIG. 1 is a general electric diagram of a battery charging device according to the present invention.

With reference to FIG. 1, a device 10 according to the present invention is suitable for charging one or more batteries 11, of the rechargeable type, for example of the NiCad (Nickel Cadmium) or NiMH (Nickel Metal Hydride) type. The batteries 11 can be housed permanently in one area of a portable electronic equipment item 12, a personal computer for example. The batteries 11 are put together in a "pack", in a known way, and are connected together in series or in parallel. The personal computer 12 may be powered in the course of operation by the batteries 11, or alternatively, by the alternating current mains 20 through a power supply-transformer 13. The pack 14 of batteries 11 has two terminals 15 and 16 suitable for connection to the personal computer 12 by means of the connectors 17 and 18, respectively.

The personal computer 12 comprises internal circuits 22, which in turn comprise a central processing unit (CPU) 23, a microprocessor or microcontroller based control circuit 24, which is arranged to be commanded by the CPU 23 and an oscillator or time base circuit 25. The controller 24 is comprised by a component for controlling the functions of the keyboard and of the track positioner (not represented in the drawings) of the personal computer 12, known as the keyboard controller, and comprises within a memory 26 and an analogic-digital section 27.

In accordance with one characteristic of the present invention, one section 28 of the memory 26 stores both data corresponding to predetermined values for the charging current and for the rates of change of temperature of the batteries 11 to be charged, and also instructions to be processed during the charging of the batteries 11, as is described in the following. By way of example, the controller 24 may be a component of the 80C51 class, preferably of the KV87C51SLAM type produced by Intel Corp.

The device 10 comprises a temperature sensor 19 incorporated in the pack 14 of batteries 11 and positioned adjacent to the external surface of one of the batteries 11 in order to generate an analogic signal TEMP, indicating the temperature of the batteries. This signal TEMP is arranged to be transmitted to the personal computer 12 through a connector 21.

To supply the energy needed to charge the batteries 11, the power supply-transformer 13 is connected on the one hand to the alternating current mains 20 and on the other hand, through the connector 29, to the personal computer 12 in order to apply to the latter a voltage VOLT arranged to produce an input current Ia. The latter is arranged to be subdivided, in correspondence with a node 31, into a current Ic to power the circuits 22 and into a charging current Ib addressed to the batteries in order to charge them.

Interposed between the node 31 and the connector 17 are a switch 32, and a regulation circuit 33, both arranged to be controlled by the controller 24, and having the function of, either allowing a current Ib to flow freely towards the batteries 11, when the switch 32 is closed, or of allowing a current Ip, of programmed value and regulated by the circuit 33, to flow when the switch 32 is closed.

The device 10 also comprises a measuring circuit 34, connected to the connector 18 and to the earth 35 of the personal computer 12, for measuring the value of current Ib and generating the corresponding signal CUR, which is arranged to be sent to the controller 24. An amplifier circuit 36 is arranged to amplify the signal TEMP before sending it to the controller 24.

The signal TEMP amplified by the circuit 36 and the signal CUR are digitized by the analogic-digital section 27 of the controller 24, so that they can be processed by the computing section of controller 24.

Also included is a known type of detecting means 37, connected to the pack 14, and arranged to detect and report to the personal computer 12 what type the batteries 11 are.

The operation of the device 10 described up to now is as follows. When the personal computer 12 is connected to the power supply 13, the batteries 11 are arranged to receive the charging current Ib, which is susceptible to variation since it depends on the amount of current Ic absorbed by the circuitry 22, as Ib=(Ia−Ic).

During charging of the batteries 11, the switch 32 is closed, as shown in FIG. 1, in order to allow the current Ib flow towards the said batteries 11. Later, on termination of charging, the switch 32 will be opened so that only the current Ip of predetermined value and regulated by the circuit 33, as is described later, reaches the batteries 11. Furthermore switch 32 remains closed even when the personal computer 12 is disconnected from the power supply 13, and is powered, not by the latter, but by the batteries 11. In this case, the switch 32 allows a power supply current Icl to pass in the direction opposite to that of the charging current Ib, that is to say from the batteries 11 to the circuits 22. It must also be stated that powering of the personal computer 12 with the batteries 11 takes place only when the said personal computer 12 is not connected to the mains 20 through the power supply 13. If, in fact, the personal computer 12 is connected to both the power supply 13 and to the pack 14 of batteries 11, the current Icl will be null due to the fact that the current Ic coming from the power supply 13 will prevail at the node 31.

During charging of the batteries 11, the controller 24, on the basis of the value of the signal CUR, establishes a corresponding reference value $\Delta$Tref for the variation in temperature of the batteries during an established time period $\Delta$tpref of a few seconds. The relationship between the reference value and the established time period $\Delta$Tref/$\Delta$tpref, may be indicated simply with $\Delta$Tref if it is assumed that Tpref has a unitary value. Furthermore, as $\Delta$tpref is quite small, the value $\Delta$Tref may be considered as also being equal to the reference value of the rate of change in temperature.

According to one characteristic of the device 10, the reference value $\Delta$Tref is established, not only in relation to the CUR value of the charging current Ib, but also in relation to the type of battery 11 being charged. To this end, the detecting means 37 generate in a known way a signal TYP, indicative of the type of battery connected to the personal computer 12, which is sent to the controller 24, where the signal in question is considered together with signal CUR in order to establish $\Delta$Tref.

The controller 24 is arranged to appropriately establish the reference value Tref, selecting it from among a plurality of reference values for the rate of change of temperature stored in section 28 of the memory 26 of the controller 24. For example, the controller 24 can avail of a table, stored in section 28 and structured in pairs of values, respectively of the charging current Ib and of the corresponding rate of change of temperature $\Delta$Tref, or may use equivalent means, such as an algorithm arranged to perform the same functions as the table, so that for a predetermined value for current Ib, there is a corresponding reference value for rate of change of temperature. In any case, the controller 24 is arranged to define the corresponding reference value $\Delta$Tref, on the basis of a current value (signal CUR).

The diagram of FIG. 4 is an example of the trend of the Tref values in relation to the different charging currents Ib. The controller 24 is also able to calculate, on the basis of signal TEMP and of the parameters supplied by the oscillator or time-base 25, the effective variation $\Delta$Teff of temperature of the batteries 11 in an established time period, equal to the one used to establish the reference value $\Delta$Tref and therefore indicated by means of the same symbol $\Delta$tpref. In this way, the effective variation of temperature during the established time period corresponds essentially to the effective rate of change of temperature, indicated as $\Delta$Teff/$\Delta$tpref, or simply as $\Delta$Teff, as the time period $\Delta$tpref is small enough to be considered as being of unitary value.

Finally the controller 24 then compares $\Delta$Teff with $\Delta$Tref and, if it establishes that $\Delta$Teff is greater than or equal to $\Delta$Tref, it stops charging of the batteries 11, thereby causing switch 32 to open and activating the regulator 33, so as to allow to flow in the direction of the batteries 11 the reduced current Ip, of a predetermined value and insufficient to affect charging of the said batteries 11.

The charge method used by the device 10 therefore comprises the following stages, illustrated in diagram form in FIG. 2. First and foremost, the batteries 11 are brought into an operating state of charge (block 40), during which they can receive the current Ib. The value of the current Ib is measured to generate the signal CUR to be sent to the controller 24 (stage 41). The reference value ΔTref is then established (stage 42) for the rate of change of temperature, in relation to the value of current Ib. The effective value of the rate of change ΔTeff is measured (stage 43) and finally this effective value ΔTeff is compared (stage 44) with the reference value ΔTref established in stage 42. If the result of the comparison (stage 44) shows that ΔTeff is less than Tref, then charging of the batteries 11 continues, that is to say the situation remains that of the operating state of block 40. On the other hand, if the result of the comparison of stage 44 shows that ΔTeff is greater than or equal to ΔTref, then there is passage into the stage where the battery 11 charging current Ib is interrupted or reduced considerably (stage 46).

Conveniently, in a preferred embodiment of the method according to the present invention (FIG. 5), the comparison made in stage 44 is repeated a number of times over a predetermined time period Tpred (a few minutes, for example), measured by a counter, not shown in the drawings, of time "t" much longer than the established time period Δtpref, with a view to verifying that the result of the comparison itself does not vary during this time Tpred, before interrupting charging of the batteries 11 as in stage 46. This improvement to the method ensures that interruption of the charge occurs only after the rate of change of temperature has become stable at a value equal to or greater than the reference value.

The charge interruption stage 46 may be followed by other stages, none of which indispensable and therefore not represented in the drawings. These may include a first stage, for example, of established duration, in which the battery 11 receives a first current of lower value and a second stage, subsequent to the first stage in which the battery 11 is powered with an almost null current, designed to maintain the charge level reached.

FIG. 3 illustrates the trend of temperature of a battery 11, of known type, charged with different currents of decreasing value (Ib1, Ib2, Ib3 and Ib4) using the device and method of the present invention, in which the end of charge times t1, t2, t3 and t4 are indicated by a broken, dotted line and also differ in relation to the different values of current Ib1, Ib2, Ib3 and Ib4.

It remains understood that changes and/or additions may be made to the device and method described up to here without going beyond the scope of the present invention.

We claim:

1. A device (10) for charging a battery (11) comprising:
   first measuring means (34) to measure the charging current (Ib) of the said battery (11),
   second measuring means (19) to measure temperature of the said battery (11),
   computing means (24) to calculate the value of the variation in temperature (ΔTeff) of the battery (11) over an established interval of time,
   comparing means (24, 26) to compare this value of variation of temperature (ΔTeff) with a reference value (ΔTref),
   interrupting means (32) to interrupt the charging of the said battery (11) when the said temperature variation value (ΔTeff) equals or exceeds the said reference value (ΔTref), and
   defining means (24, 26) for defining said reference value (ΔTref) in relation to the value of current (Ib) measured by said first measuring means (24, 34).

2. A device (10) according to claim 1 wherein the said computing means (24), said comparing means (24, 26) and said defining means (24, 26) are comprised by a controller circuit (24) to control said first measuring means (34), said second measuring means (19) and said interrupting means (32), the said controller circuit (24) has a memory (26) in which a plurality of reference values are stored, and wherein said reference value is selected from among said plurality of values.

3. A device according to claim 2, wherein said controller circuit (24) comprises a microprocessor and is composed of a controller called keyboard controller.

4. A device according to claim 1, wherein the said comparing means (24, 26) can perform many comparisons over a predetermined interval of time longer than the said established interval of time with the purpose of verifying if the said temperature variation value (ΔTeff) remains equal to or greater than the said reference value (ΔTref) in each of the said comparisons, and
   wherein the said battery charge interrupting means (32) are designed to be activated at the end of said predetermined interval of time, only if all the said comparisons indicate that the said temperature variation value (ΔTeff) equals or exceeds the said reference value (ΔTref).

5. A device according to claim 4, wherein the said established interval of time is of the order of a few seconds and that the said predetermined interval of time is of the order of a few minutes.

6. A device according to claim 1, comprising detecting means to detect the type of battery to be charged coupled to the said first measuring means for producing definition of the said reference value (ΔTref) by the said defining means (24,26).

7. A method for charging a battery (11) comprising the stages of:
   measuring (40) the value of the battery charging current (Ib),
   measuring the temperature of the battery (11),
   calculating (42) the value of variation of battery temperature (ΔTeff) over a given interval of time,
   comparing (44) said temperature variation value (ΔTeff) with a reference value, and
   interrupting (46) the charging of said battery (11) when said temperature variation value (ΔTeff) equals or exceeds said reference value (ΔTref), wherein said reference value (ΔTref) is defined in relation to the said charging current value.

8. A method according to claim 7 characterized by a stage for detecting the type of battery to be charged and in that the said reference value (ΔTref) is defined in relation to the type of battery to be charged.

9. A method according to claim 8 characterized by the fact that the said reference value (ΔTref) can be selected from among a plurality of temperature reference values, each one associated with a corresponding charging current value.

10. A method according to claim 9 in which the said comparison (44) is repeated several times over a predetermined interval of time (Tpred) longer than the said established interval of time, characterized by the fact that the said charge interruption stage (46) is activated at the end of the said predetermined interval of time (Tpred) only if said comparison (44) indicates in all of the said several times that said temperature variation (ΔTeff) equals or exceeds said reference value (ΔTref).

* * * * *